April 19, 1960     A. L. SMITH     2,932,857
COTTON CONDITIONING APPARATUS
Filed July 11, 1957     2 Sheets-Sheet 1

INVENTOR
Algernon L. Smith

BY
ATTORNEYS

April 19, 1960     A. L. SMITH     2,932,857
COTTON CONDITIONING APPARATUS
Filed July 11, 1957     2 Sheets-Sheet 2

INVENTOR
Algernon L. Smith

BY
ATTORNEYS

United States Patent Office 2,932,857
Patented Apr. 19, 1960

2,932,857
COTTON CONDITIONING APPARATUS

Algernon L. Smith, Birmingham, Ala., assignor to Continental Gin Company, Birmingham, Ala., a corporation of Delaware Application July 11, 1957, Serial No. 671,188

15 Claims. (Cl. 19—67)

This invention relates to cotton conditioning apparatus, particularly to a cotton drier.

Drying apparatus is particularly essential in properly preparing seed cotton for cleaning and ginning for the reason that it is practically impossible to clean cotton containing excessive moisture. Moist cotton fibers tend to cling together and to mat into heavy wads. This causes the commingled trash and dirt particles normally present in the cotton prior to ginning to remain embedded therein. Likewise, moist cotton is difficult to gin due to the tendency of the moistened fiber to mat or pack, and it will frequently choke in the ginning ribs and the saw teeth. This has become an increasingly serious problem to cotton ginners over the past few years as a result of the tremendous increase in the use of mechanical harvesting equipment. Mechanical harvesters are essential to modern farm operation; however they have considerably increased the cleaning problems of the ginners. Mechanical harvesters are not as selective as hand labor and all mechanical pickers gather a considerable amount of grass and leaf particles and other foreign matter, along with the cotton, which, of course, must be removed. This in itself requires improved and more thorough drying. Furthermore under the pressure of modern farming much of the cotton crop is now gathered when it is wet from rain or dew and thus will contain more moisture than formerly. Even when the cotton fields are relatively dry the moisture content is increased by the new mechanical cotton pickers. The latter, for example, employ moistened rubber covered spindles that rotate to entwine the cotton and pull it from the cotton boll. In order to help the spindles pick up the lint they are continuously sprayed with water frequently containing a detergent which helps to spread the water and increase the friction or drag of the spindle, thereby making it easier to entwine the cotton. Even where picking is still done by hand few cotton farmers can now afford to wait for ideal picking weather so that the cotton could be gathered after natural drying in the fields as was customary fifteen or twenty years ago. All these factors have contributed to increased moisture as well as the necessity for increased cleaning. Improved drying has thus become a major problem. As a consequence many kinds of driers have been proposed over the intervening years.

The drying apparatus in common use in the cotton ginning industry today are of two basic types, namely: driers in which both the cotton and the heated air flow in the same direction and driers in which the heated air is forced laterally through the moving stream of cotton. In the latter form the heated air is passed in through one side of the stream of lint and out the other side. Foraminous screens are used to prevent the escape of the cotton with the air. A typical example of the first type is that of Bennett, Patent No. 1,871,773. A typical example of the latter type is that of J. E. Mitchell, Patent No. 2,025,700 or No. 1,962,320 or both. Numerous variations of these two basic types have been manufactured and a few of them have become commercially successful. However, all examples of both types have major disadvantages in that they require numerous beaters, shafts, pulleys, etc., and are of a correspondingly large size. As a result they are quite expensive to manufacture and to operate. Further, they occupy a relatively large amount of space in gin outfits which have already been overcrowded due to the adoption of other new machinery. In fact in many older gins modification of the building is necessary before a new drier of either of these types can be installed.

Most important of all, however, is the fact that these driers frequently cause damage to the cotton fiber due to the excessively high temperatures and long exposure periods required to achieve drying.

There is a third basic type of drier which heretofore has not enjoyed any measure of commercial success, namely; that in which the heated air used to dry the cotton flows counter to the flow of the cotton itself. Such a drier is shown in Sims Patent No. 2,214,680. The only other example of this type drier adapted for use with cotton is that of Roeder Patent No. 2,430,686. Another example illustrating the third type is Bergman's coal drier, Patent No. 1,535,804.

It will be seen that all the examples of this third type drier have the same primary features in common. They are of relatively long vertical construction, having a plurality of rotatable throwing members arranged in opposite rows adjacent the sides of the casing and have shelves, screens or baffles which are used to lengthen the exposure of the material by impeding its passage through the casing. The material to be dried is introduced through the upper end of the casing and directed by the various means shown to gravitate downwardly in a zigzag path through a column of rising heated air which is introduced near the lower end of the casing.

As the name implies, the principal object of all the various types of driers is to have the hot air remove the moisture from the cotton. Heretofore it has been generally thought that relatively long exposure to the heated air was necessary to extract the moisture from seed cotton and, as seen in all the illustrations mentioned above, all driers employed some means to impede the movement of cotton through the casing and thus increase the exposure time. Most of the patents granted to inventors of such driers clearly set forth specific means for causing the cotton to move back and forth across the casing in a zigzag path or to otherwise retard the movement of the cotton through the casing in order to insure the relatively long exposure which has heretofore been generally accepted as an essential feature of cotton drying. However, this approach to the problems has not proven satisfactory, as pointed out more fully below.

Many experiments have been conducted in attempts to produce an efficient drier that will dry cotton satisfactorily without damaging the fiber, and many new models of driers have been proposed or devised with a view to improvement of the drying operation. However, the direction of these efforts always appears to be that of lengthening the exposure of the seed cotton to the heated air by lengthening the drier casing or by increasing the number of the shelves, baffles and throwing members or agitators. This is frequently achieved by actually combining two or more driers in series. In such equipment the outlet of the first drier is connected to the inlet of the second with suitable conduit means, in effect, making a drier twice as long or twice as high. Larger fans and more power are required to force the air through such two stage driers, and the furnaces used to heat the air require a great deal more fuel to heat the greater volume of air being handled. Accordingly, with such equipment as well as with that previously discussed as being proposed the cost of the apparatus and installation, as well as the cost of operation, has risen. These costs rise in direct relation to the increase in size and complexity of the driers and the increase in the amount of air that is needed to properly operate.

A further disadvantage of these newer driers, which is particularly apparent with the type of drier in which the hot air travels in the direction opposite to that of the cotton, is due to this increased amount of machinery consisting of cotton throwing means or beaters and baffles and their associated belts, pulleys or other driving means used to tear the wads of cotton apart to effect the drying operation and movement of the cotton. These tend to overwork the cotton to such extent that there is a definite lowering of the grade. The progress of the cotton through the drier is also retarded in such driers by the presence of so much machinery. This contributes to the overworking of the cotton as well as to frequent "chokes." Further the increased machinery and size of the drier or the use of two driers results in the drying equipment occupying more space and this has another disadvantage and a very important one from the practical standpoint. Specifically, the increased size of the equipment results in increased shipping cost and installation costs and an increase in the amount of space which must be occupied by the machinery. As pointed out above, this often requires modification of the gin house in order to install the equipment.

Another method of accomplishing the effects of the increased exposure that has been employed is the use of increased temperature. In addition combinations of increased equipment sizes, beaters, baffles, throwing means and increased temperatures have been proposed and tried. However, the increased temperatures in themselves have deleterious effects on the cotton.

Cotton is a carbohydrate of the cellulose group, composed of carbon, hydrogen and oxygen ($C_6H_{10}O_5$). Irreversible chemical decomposition of the fiber starts to take place at around 248° Fahrenheit and this is known as the "critical" temperature of cotton. This decomposition is accompanied by a corresponding loss of tensile strength and elasticity which cannot be then restored by rehumidification. Furthermore, because of the resulting brittleness, cotton that is heated above the critical point gins poorly and there is a substantail shortening of the fiber which results in a penalty in the form of lower grades or complaints from the mills.

In my research directed toward the development of drying apparatus which could not damage the cotton fiber but at the same time which would function efficiently to remove the moisture I discovered that cotton fiber gives up its moisture to heated air very quickly if it can be opened and exposed on all sides so as to permit the heated air to penetrate to the seeds from which the fiber grows.

I also discovered that heated air, flowing through a zone of cotton containing adequate moisture, becomes saturated or "absorbs" the full amount of moisture it is capable of picking up at any given temperature almost instantaneously.

Experiments have proved conclusiely that with the air properly conditioned and with use of a proper volume the absorbtion will be complete. There will in fact be no additional drying, that is; further transfer of moisture from the moisture laden cotton fiber to the saturated heated air, even though the exposure time of the cotton to the saturated air is doubled or quadrupled. This is true because the ability of hot air to absorb moisture is limited by its temperature and if the air absorbs all the moisture it can in a single initial contact with the cotton it can absorb no more at the same temperature no matter how long it remains in contact with the cotton.

Further, the air has its greatest potential drying ability when it initially contacts the moist cotton upon entering the drier casing and readily takes on moisture as it first contacts the cotton. However, this transfer of moisture from the cooler cotton fibers to the warmer air is reversible if the exposure is lengthened sufficiently. Since the ability of hot air to absorb moisture is limited by its temperature it naturally gives up some of this moisture as it cools in its travel through the casing and the moisture initially absorbed is partially redeposited in the cotton if the exposure is of relatively long duration.

These vaporization experiments have finally led me to the development of what I prefer to call a flash drying technique and the development of flash drying apparatus. In the development of this technique and apparatus the characteristics of the cotton fiber itself requires careful consideration.

It is a well known characteristic of all seed cotton to fluff up as it dries. What has not been heretofore known or understood is that the shelves, foraminous screens, baffles and/or other means heretofore used to impede the progress and increase the drying time of the cotton actually tended to be self-defeating by giving the cotton something to pack against so that it could not be exposed to the heated air effectively. This is true regardless of whether or not the cotton and the air flow across the baffles and through the casing in the same direction or whether the air flows in a direction opposite that of the cotton. In either event the cotton tends to roll and pack together in layers, thereby forming a coat of highly effective insulation around itself. The thermal conductivity of loosely packed hollow vegetable fibers, such as cotton or kapok, is only .24 B.t.u. per hour per square foot per degree Fahrenheit per inch of thickness. As a result of this rolling and packing the majority of the fibers surrounding the seed locks can never be reached by the hot air and so consequently cannot give up their moisture. This tendency of cotton to insulate itself when allowed to wad has caused excessive heat to be applied in driers heretofore in common use in an effort to literally force out the moisture. However, in the long casings with their associated means for retarding the passage of cotton generally employed the air became quickly saturated with moisture and there was little if any increase in actual drying. There was usually, on the contrary, considerable permanent damage to the outer fibers of the wads due to longer exposure and increased temperature. This tendency toward use of higher temperatures as well as longer exposures has in fact resulted in widespread complaint from the cotton mills due to damage as a direct result of the combined effects of long exposure and the high temperatures.

As mentioned heretofore all prior development has been directed toward increasing the length of exposure of the cotton to the heated air rather than toward improving the efficiency of such exposure. Accordingly, an object of the instant invention is to provide a cotton drying means which will effectively and efficiently dry cotton, particularly cotton picked by mechanical means and yet which does not have the disadvantage of injuring the cotton or other undesirable characteristics pointed out above.

Another object of the present invention is to provide a cotton drying apparatus which is of relatively small size as compared to the present tower type of driers such as those of Bennett or Sims mentioned previously and which accordingly can be placed in installations where it is impossible to place the known tower type driers.

A still further object of the invention is to provide a cotton drying apparatus embodying a relatively short vertical casing drying means which utilizes a single cotton working cylinder to thoroughly open into single seed locks and disperse any wadded masses of cotton entering the casing so that the same can be thoroughly and completely exposed to the heated air.

Yet a further object of the invention is to provide a drier having a casing entirely free of shelves or baffles designed to impede the flow of cotton through the casing, and in which the cotton will pass through in a free falling stream of dispersed seed locks so that each seed lock can be completely exposed to the heated air without damage to the cotton.

Yet a further object of the invention is to provide a drier which will thoroughly and efficiently dry the cotton with relatively lower operation and maintenance costs.

The common type of tower drier heretofore known requires a large volume (six thousand cubic feet per minute for example) of heated air. Further, as previously discussed above, temperatures above the critical point of cotton are also frequently used. A drier built in accordance with the present invention, however, will remove the same moisture from the cotton with approximately one-third of the volume of air previously thought necessary and also can employ air of a lower temperature. Furthermore, the passage of the cotton through the casing permits a very short exposure and consequently the cotton will never under normal operating conditions reach the critical temperature even though that of the air may exceed that figure.

According to the invention, there is provided apparatus which will open and fluff the cotton and provide a short exposure to heated air, during which moderate or safe fiber temperatures will not be exceeded and thus an object of the invention is, accordingly, to provide apparatus which will enable the cotton to quickly give up its moisture without being overheated.

My experiments have finally led to the development of a technique of drying which is different in principle from the previous drying methods. When cotton is opened and presented to warm dry air in accordance with my invention a type of drying which I prefer to call "flash drying" is possible. Employment of the principles of my invention makes it possible to dry cotton with shorter air exposure time and with less "working" than heretofore deemed necessary. Further, as a bonus, lower temperatures and reduced quantities of air are used than heretofore possible. This is all incident to my new technique. The advantages are increased further due to these consequences leading also to a reduction in size and amount of equipment as well as shorter exposure time. This "flash drying" is further highly desirable because there is no chance of damage to fiber or seed with the short exposures and moderate fiber temperatures made possible by such technique.

A still further object of the invention is to provide a type of drier constructed according to these concepts and which will provide this quick "flash drying" as contrasted with the heretofore relatively slow "cumulative" drying.

These and other objects and advantages will become apparent from the following description and the accompanying drawings in which.

Figure 1:
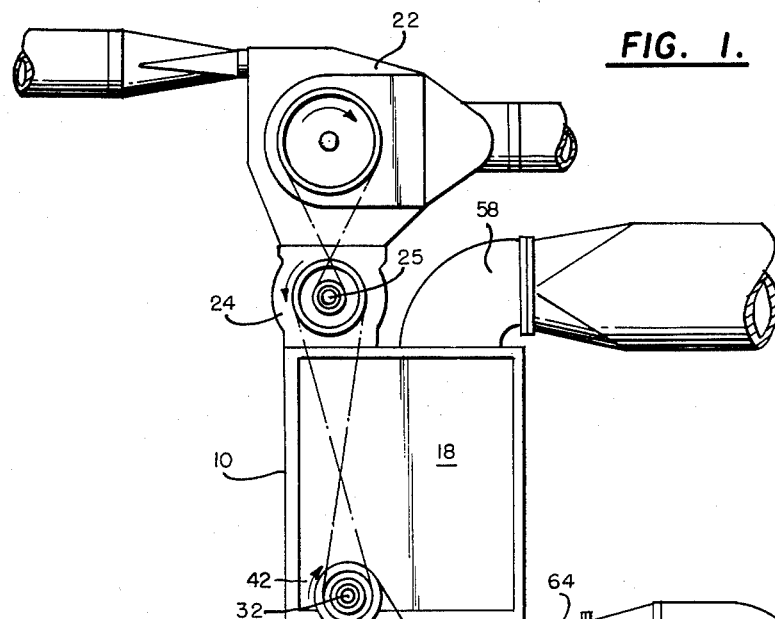
Figure 1 is a side elevational view.
Figure 4:
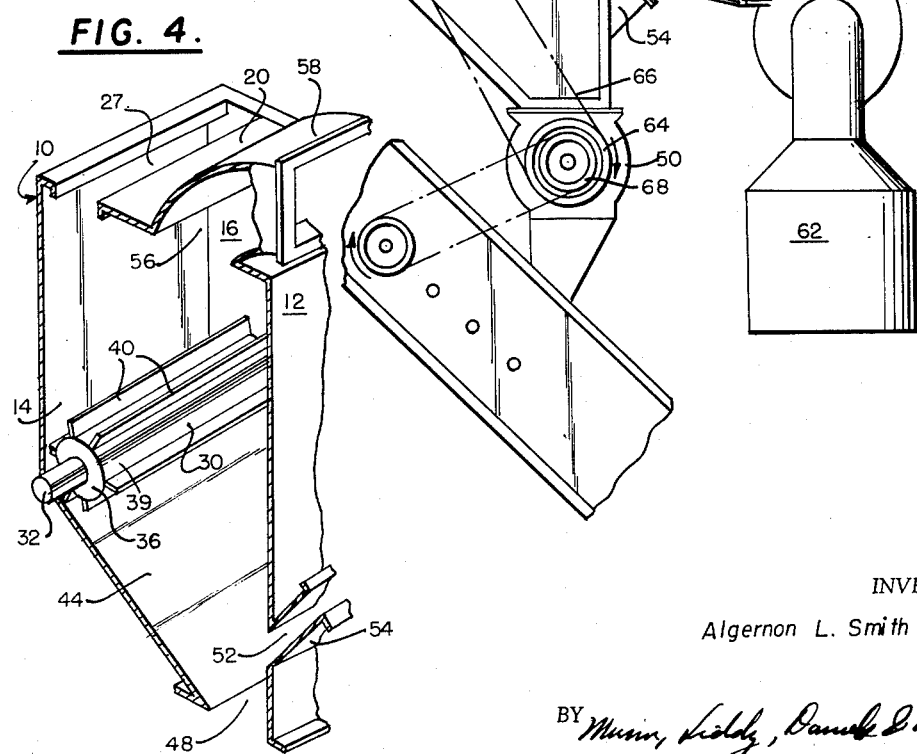
Figure 4 is a fragmentary perspective view.
Figure 2:
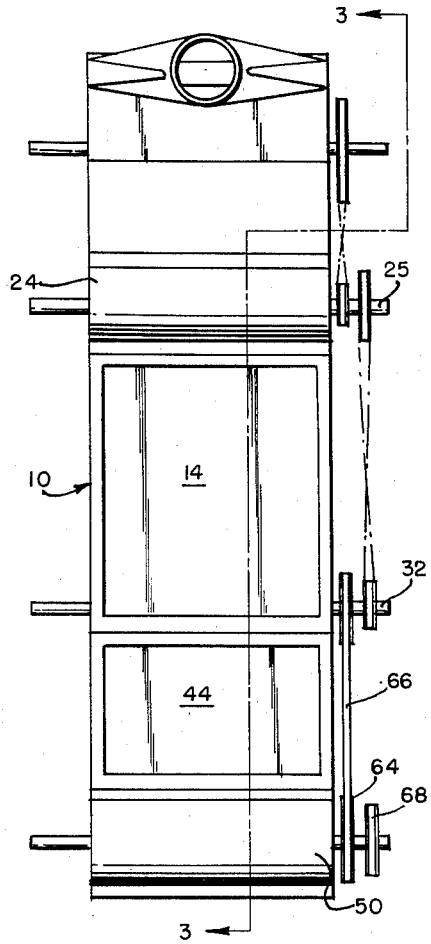
Figure 2 is a front elevational view.

Referring now in particular to the drawings: One preferred embodiment of my invention comprises a vertically extended casing 10, which is of generally rectangular horizontal cross section. The casing comprises the side walls 12, 14, 16 and 18. The casing further has an upper wall 20 bridging the side walls 12, 14, 16 and 18.

A cotton separator 22 is supported above the casing 10. The separator is connected to a vacuum dropper 24. The vacuum dropper is constructed in the usual manner and comprises a shaft 25 and vanes 26 fastened to the shaft and functions to receive the cotton from the separator and drop it therefrom without the introduction of air into the separator through the cotton inlet. The casing 10 has a relatively narrow rectangular cotton inlet 27 positioned adjacent one side wall 14 of the casing and longitudinally aligned therewith. The inlet 27 and the vacuum dropper extend substantially the length of the casing wall 14 and are parallel to the wall 14 as well as adjacent thereto. The inlet 27 is located in upper wall 20 in relation to the wall 14 so that the cotton enters the casing 10 through the inlet 27 adjacent the wall 14 and falls downwardly substantially parallel to said wall 14 and closely adjacent thereto.

A cotton opener roller 30 is positioned adjacent the lower end of the wall 14 and a substantial distance beneath the inlet 27. The shaft 32 of the roller extends parallel to the wall 14 and thus parallel to the shaft 25 of the dropper 24. The shaft 32 extends through the walls 16 and 18 and is supported in journals mounted outside the latter walls. Opener roller 30 extends substantially from one wall 16 to the other wall 18. The roller comprises a pair of spaced drum ends 36 and 38 mounted on the shaft 32 and encased in a wrapper sheet 39. The spaced radially extending vanes 40 are mounted on the wrapper sheet.

The diameter of the roller 30 in the embodiment illustrated is slightly more than two feet over the tips of the vanes. The roller shaft 32 is positioned so that the vanes clear the adjacent casing wall 14 by approximately two inches, whereas the opposite wall 12 is positioned laterally of the roller a distance equal to somewhat greater than the diameter of the roller 30. The shaft 32 of roller 30 is positioned below the inlet 27 a distance equal to approximately two and one-half times the diameter of the roller 30. With the roller 30 positioned in the illustrated relationship to wall 14 and the inlet 27, cotton released by the dropper 24 drops freely onto the left-hand side of the roller 30, that is, to the left of the shaft as viewed in Figure 1.

The roller is rotated in the direction of arrow 42, thus the cotton strikes upon the upcoming side of the roller. The roller 30 in the illustrated embodiment is rotated at a tip speed of approximately twenty-four feet per second.

The wall 14 is terminated at a point somewhat below the center line of shaft 32 and merged into a downwardly and inwardly sloping wall 44. Wall 44 extends downwardly and inwardly a substantial distance toward wall 12 as the latter continues to extend substantially vertically downwardly. At the lower end of walls 44, 12, 16 and 18 is a cotton outlet forming opening 48. Opening 48 extends substantially the full width of the casing between walls 16 and 18 and is parallel to walls 12 and 14. Outlet 48 is adapted to be connected to vacuum dropper 50 which can be of the same construction as vacuum dropper 24 and functions to drop the cotton outwardly of the drier casing without permitting the passage of substantial quantities of air.

A hot air inlet 52 is provided in wall 12 near the lower end thereof. The air inlet 52 is of a width substantially equal to the width of the casing and is connected to an inlet hot air pipe 54. The latter extends upwardly away from the wall 12 and is adapted to be connected to the fan 60 and heater 62 by means of duct 64. An air outlet opening 56 is provided in upper wall 20 adjacent wall 12 and an outlet conduit 58 is connected thereto. The width of the opening 56 is substantially equal to the diameter of roller 30 and extends substantially completely across the casing parallel to the roller 30. It should be noted that there is thus provided a casing having a relatively wide unobstructed passageway vertically along the right-hand side of the casing as viewed in Figure 3 adjacent the wall 12 substantially the full width of the casing between walls 16 and 18. Wall 44 serves to direct the incoming air which passes beneath the roller 30 upwardly alongside of the roller and through the falling cotton, and thus contributes to the free flow of the air.

Experiments have shown that free falling seed cotton as customarily brought to cotton gins falls the first twenty feet in approximately 1.40 seconds, varying according to the amount of moisture contained and the density of the wads or masses. The roller is rotated at a tip speed of greater than the terminal speed of the cotton. In this instance the roller rotates at a tip speed of about 24 feet per second. It is obvious that the speed of roller 30 can be chosen to suit the nature and quantity of cotton being passed through the drier.

Figure 3:
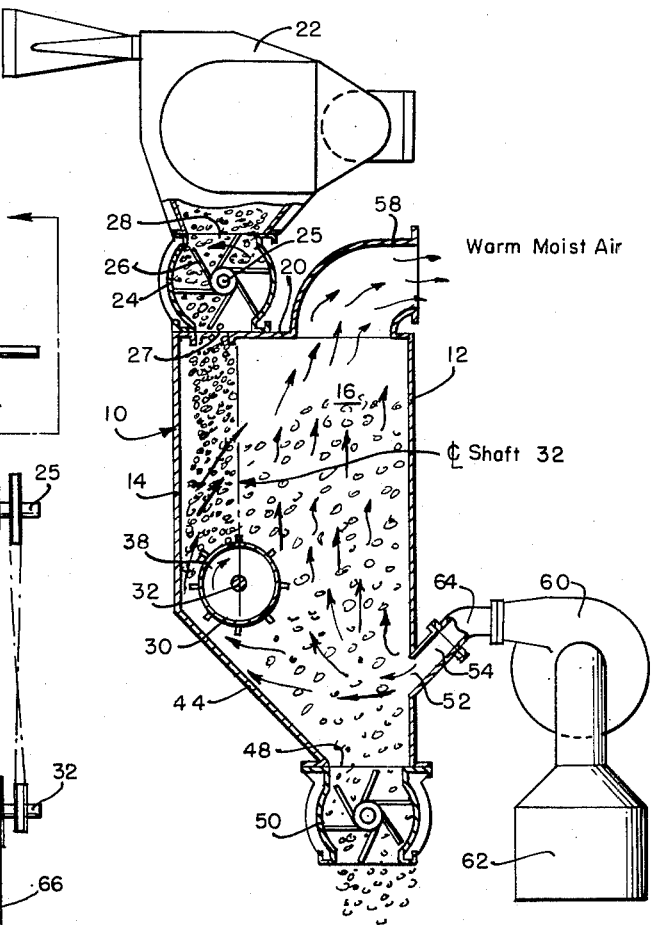
Figure 3 is a sectional elevational view taken along line 3—3 of Fig. 2 which also shows travel of the cotton and the air in the drier.

As illustrated in Figure 3, the cotton is dropped inwardly of the inlet 27 and falls downwardly adjacent the wall 14. The cotton thus strikes the roller 30 on its upcoming side with the roller 30 rotating so that its peripheral speed is greater than the speed of the falling cotton entering through inlet 27. The resulting impact breaks up the wads of cotton completely and impels the cotton upwardly and across the casing as fast as it reaches the influence of the vaned roller. Visual inspection through suitable glass window inserts provided in the casing reveals a snow storm like dispersal of cotton which is thrown upwardly and across into the unobstructed vertical passageway of the drier casing. The force of the impact is such that the cotton is trajected or impelled substantially to the top of the drier casing and to the right of the roller 30 as seen in Figure 3, filling the unobstructed portion of the casing with this completely dispersed, opened and fluffed cotton.

In the meantime hot dry air is being supplied through the hot air inlet pipe 54. This hot dry air moves in the direction indicated by the arrows in Figure 3 upwardly through this "snow storm" of virtually "single-locked" cotton. The air is enabled to thoroughly contact all the fibers on the individual seed locks by virtue of this complete opening. In contrast with heretofore known driers the cotton is not impelled back and forth from one side of the casing to the other onto baffles or foraminous screens. Nor is the cotton allowed to roll and slide slowly downwardly along the upper surface of such baffles or screens, twisting and packing upon itself.

Instead, as the cotton is opened and dispersed upwardly it reaches a peak substantially above the roller, moving in a transverse direction across the rising column of heated air, then curves and comes freely down without restraint. All this time the hot dry air is moving into the casing and up through the cotton. The freely dispersed cotton is exposed to the hot air during its swift downward path through the casing in its open state and as the cotton moves downwardly it becomes drier and drier and more fluffed and open. In this condition it can be cleaned with the minimum of working. This results in a considerable increase in the efficiency of the drier as compared to heretofore known driers. Furthermore, the drying is accomplished without any fiber damage whatsoever. In fact, tests run under the air temperature conditions that would have been damaging in ordinary driers failed to show any fiber damage at all in the present invention.

In comparison tests of a tower type drier constructed as heretofore known, comprising a series of shelves to impede the progress through the casing, an average of 15.6 percent moisture was removed. In tests on the drier constructed in accordance with the instant invention as embodied in the drawings, an average of 22.8 percent moisture was removed.

Further, the improved results were achieved with less machinery, less power, less rolling and twisting of the cotton, a lower fiber temperature and with smaller, more compact apparatus.

In fact, a substantial reduction in the quantity of air needed to place the same quantity of cotton in the same or even drier condition, can be achieved. For example: A reduction in the quantity of air needed, amounting to 66⅔ percent approximately, was achieved in tests on identical lots of cotton. Further, the lower volume of air required can be heated to the same temperature with a similar reduction percentagewise in the amount of fuel consumed by the furnace.

Since volume varies directly with the fan speed, pressure with the square of speed and power as the cube of the speed for constant conditions, the following example will show the amount of power saved with a drier of the present invention: A typical tower type drier heretofore used requires a cotton type centrifugal exhaust fan with either a six or eight straight blade blast wheel 30" outside diameter by 12 to 14" in width, with nineteen inch diameter inlet and fourteen inch diameter outlet, running at two thousand r.p.m., handling six thousand cubic feet of air per minute at eighteen inches static pressure (water gage), and a minimum fan shaft imput of thirty horsepower. Since at least equal drying can be achieved with a drier of the present invention with only two thousand cubic feet of air per minute, the corresponding reduction in speed, pressure and horsepower can easily be determined as shown below:

For speed,
$$\text{ratio } \frac{2000}{6000} = .333$$

For pressure,
$$\text{ratio } \left(\frac{2000}{6000}\right)^2 = .111$$

For horsepower,
$$\text{ratio } \left(\frac{2000}{6000}\right)^3 = .037$$

Original fan speed of 2000 r.p.m. × .333 = 666 r.p.m. required to handle 2000 cubic feet of air per minute.

Original fan static pressure of 18 inches water gage × .111 = 1.998 inches static pressure required to move 2000 cubic feet of air per minute.

Original fan horsepower of 30 × .037 = 1.110 horsepower required to drive fan handling 2000 cubic feet of air per minute.

This is a power reduction of over 96 percent.

It will be obvious to those skilled in the art that the reduction in the amount of air required to be handled by the fan not only allows a spectacular reduction in power requirements but will allow the use of a much smaller fan.

It is pointed out that the pipe 54 slopes downwardly and falling cotton cannot lodge in it. The dried cotton falling below the inlet 52 collects into the dropper 50, from which it is dropped outwardly of the drier casing. Hot air supply pipe 54 is connected to the usual fan 60 and heater 62 and the latter are adapted to supply heated air as desired through duct 64.

The shafts 32 and 25 and the shafts of the separator 22 and dropper 50 are fitted with pulleys and belts such as 64 and 66, which are in turn connected to power drive means (not shown) through drive pulley 68.

The casing of the drier is entirely open between the inlet 27 and the roller 30 and in fact the casing in the illustrated embodiment is completely open and unobstructed except for the roller itself. Thus on the down coming side of the roller, which is to the right of the roller as viewed in Figure 3, the casing is completely clear and unobstructed between the cotton outlet 48 and the hot air outlet 56. On the latter side, as is apparent from the drawings, the casing is at least open and unobstructed vertically from the air inlet to a height above the air inlet equal to the maximum height obtained by cotton thrown upward in the casing toward the right wall 12 by the roller in order to provide free unhindered travel of the opened and fluffed cotton in the trajectory imparted to it by the roller. The cotton accordingly can freely gravitate through the air and be intimately in contact therewith. The flash drying process which is embodied in the instant invention is accomplished through this thorough opening by the roller and free unhindered movement of the cotton through the hot air. The path of movement of the cotton is of an arc-like nature.

While I have shown and described the preferred form of my invention, it will be understood by those skilled in the art that many changes in form and details of construction can be made within the scope of the appended claims, and I claim an exclusive right to all changes, modifications, and forms coming within the scope of the appended claims.

I claim:

1. A cotton drier comprising a vertical casing said casing having spaced vertically extending walls, an upper wall supported by said vertical walls enclosing the top of said casing, a cotton inlet in said upper wall positioned adjacent one of said vertical walls and extending substantially entirely between two of said vertical walls, a cotton dropper connected to said casing above said inlet, said dropper including a shaft and vane means connected to said shaft, said vane means being rotatable to drop cotton through said cotton inlet adjacent said one wall, means for rotating said vane means, said one wall terminating a substantial distance beneath said inlet and merging with a lower wall sloping inwardly and downwardly of said one wall, a second shaft, a cotton opener comprising a roller rotatably supported between two of said vertical walls by said second shaft, said second shaft being positioned inwardly of the said one vertical wall with respect to the said cotton inlet, said roller comprising radially extending vanes, means for rotating said roller to throw cotton upwardly in a direction away from said one vertical wall, the diameter from tip to tip of a pair of opposed vanes of said roller being substantially the same as the diameter of said vaned dropper, said lower wall being spaced from and facing a fourth wall of said casing, the latter two walls defining a cotton outlet, cotton dropper means connected to said outlet and operable to drop cotton outwardly of said casing without the introduction of substantial quantities of air into said casing, a hot dry air inlet means extending substantially completely across said fourth wall and positioned below said cotton opener, an air outlet formed in said upper wall and means for forcing air into said air inlet said cotton opener roller being spaced beneath said cotton inlet a distance equal to approximately twice the said diameter of said opener roller, said casing being open and unobstructed vertically between said opener roller and said cotton inlet and between said opener roller and said fourth wall.

2. The apparatus of claim 1 wherein said opener roller is positioned laterally from said fourth wall a distance at least as great as the diameter of said roller.

3. A cotton drier comprising a vertically elongated casing, a cotton inlet for the introduction of cotton into said casing, said casing having an air outlet spaced from said cotton inlet, an air inlet spaced below said air outlet, a cotton outlet below said air inlet, an opener roller rotatably mounted on a horizontal axis in said casing a distance beneath said cotton inlet equal to at least the diameter of said roller, said roller being rotatable to provide an upcoming and downcoming side, said roller having a radius substantially equal to the width of said cotton inlet, said roller being positioned with respect to said cotton inlet such that one side of said roller subtends said cotton inlet, means for rotating said roller operative to move the side of said roller subtending said cotton inlet upwardly with respect to said cotton inlet, the interior of said casing being open and clear of obstructions for free gravitational fall of said cotton through said inlet and onto said roller, said casing having a wall facing the side of said roller opposite that side which subtends said cotton inlet, said casing being open and unobstructed between said roller and the latter wall vertically from said air inlet to a height above said roller equal to the maximum height obtained by cotton thrust upwardly in said casing toward said wall, said means for rotating said roller being operable to rotate said roller at a speed greater than the velocity obtained by the free fall of cotton onto said roller, said roller having a diameter of approximately two feet.

4. A cotton drier comprising a vertically elongated casing, a cotton inlet for the introduction of cotton therein, said casing having an air outlet spaced from said cotton inlet, an air inlet spaced below said air outlet and a cotton outlet below said air inlet, said casing having a pair of spaced vertical walls, an opener roller rotatably mounted on a horizontal axis in said casing a distance beneath said cotton inlet equal to at least the diameter of said roller, said roller being positioned closely adjacent one of said walls and the latter wall extending downwardly with respect to said cotton inlet, the axis of said roller being positioned substantially vertically beneath one side of said cotton inlet and being substantially parallel to the latter side of said inlet, the portion of said roller extending between its axis and the latter wall subtending a substantial portion of said cotton inlet between said one side thereof and its opposite side, said casing being open and unobstructed above said roller between said axis and said latter wall a distance at least as great as the diameter of said roller, means for introducing cotton into said casing through said cotton inlet and into the unobstructed space above said roller vertically subtended by the side of said roller adjacent said latter wall for free fall of said cotton onto the latter side of said roller, means for rotating said roller so that the latter side of said roller moves upwardly with respect to the latter wall and its periphery moves at a velocity greater than the velocity obtained by the free falling cotton in falling downwardly onto said roller, said casing being open and unobstructed on the side of said roller opposite said latter side from said roller upwardly in said casing to a height at least as great as the maximum height obtained by cotton thrust upwardly in said casing toward the other of said walls.

5. The apparatus of claim 4 including said roller having its axis substantially parallel to said one of said walls.

6. The drier of claim 4 wherein said roller is spaced from said other of said walls a distance at least approximately equal to the diameter of said roller.

7. The drier of claim 4 including said one of said walls terminating adjacent said roller, said casing having an inclined wall, said inclined wall being connected to the lower end of said one of said walls and extending downwardly beneath said roller toward said other of said walls, said cotton outlet means being positioned adjacent the bottom of said other of said walls and said inclined wall.

8. The drier of claim 7 wherein said inclined wall and said other of said walls define at least a portion of said cotton outlet.

9. The drier of claim 7 including said air inlet being positioned opposite from and facing said inclined wall.

10. The apparatus of claim 4 wherein said air inlet comprises an opening positioned in a wall of said casing, means for forcing hot air into said casing through said air inlet.

11. The apparatus of claim 4 wherein said means for introducing cotton into said casing includes a dropper means comprising a vaned member rotatably mounted and rotatable to drop cotton inwardly through said inlet and prevent the escape of air from said casing.

12. The apparatus of claim 4 including said opener roller comprising a vaned roller having spaced drum ends and vanes radially extending from the axis of said roller supported in said drum ends.

13. The apparatus of claim 4 wherein said roller is positioned below said cotton inlet a distance approximately equal to twice the diameter of said roller.

14. A cotton drier comprising a vertical casing, said casing having spaced vertically extending walls, an upper wall supported by said vertical walls enclosing the top of said casing, a cotton inlet in said upper wall positioned adjacent one of said vertical walls and extending substantially entirely between two of said vertical walls, a cotton dropper connected to said casing above said inlet, means for operating said dropper to introduce cotton into said casing through said inlet, said one wall terminating a substantial distance beneath said inlet and merging with a lower wall sloping inwardly and downwardly of said one wall, a shaft, a cotton opener comprising a roller rotatably supported between two of said vertical walls by said shaft, said shaft being positioned inwardly of the said one vertical wall with respect to the said cotton inlet, means for rotating said roller to throw cotton upwardly in a direction away from said one vertical wall, said roller having a radius substantially equal to the width of said inlet and substantially subtending said inlet, said lower wall being spaced from and inclined toward a fourth wall of said casing, the latter two walls defining a cotton outlet, cotton dropper means connected to said outlet and operable to drop cotton outwardly of said casing without the introduction of substantial quantities of air into said casing, a hot dry air inlet means extending substantially completely across said fourth wall and positioned below said cotton opener, an air outlet formed in said upper wall and means for forcing air into said air inlet, said cotton opener roller being spaced beneath said cotton inlet a distance equal to approximately twice the said diameter of said opener roller.

15. A cotton drier comprising a vertically elongated casing, a cotton inlet for the introduction of cotton therein, said casing having an air outlet spaced from said inlet, an air inlet spaced below said outlet, a cotton outlet below said air inlet, an opener roller rotatably mounted on a horizontal axis in said casing a distance beneath said cotton inlet equal to at least the diameter of said roller, said roller having a radius substantially equal to the width of said inlet, said roller being rotatable to provide an upcoming and a down-coming side, said casing being open and unobstructed above said roller for free gravitational fall of cotton through said inlet and into said roller, said roller being positioned with respect to said inlet such that the upcoming side of said roller subtends said cotton inlet, said casing having a wall facing the down-coming side of said roller, said casing being open and unobstructed on the down-coming side of said roller between said roller and the latter wall vertically from said air inlet to a height above said roller equal to the maximum height obtained by cotton thrust upwardly in said casing toward the side of said casing faced by said down-coming side of said roller, said opener roller being positioned above said air inlet means, and means for rotating said roller at a speed sufficient to thrust cotton freely falling onto said roller upwardly a substantial distance and toward the latter wall.

References Cited in the file of this patent
UNITED STATES PATENTS

| | | |
|---|---|---|
| 2,024,469 | Mitchell | Dec. 17, 1935 |
| 2,430,686 | Roeder | Nov. 11, 1947 |
| 2,820,306 | Smith | Jan. 21, 1958 |